US012576735B2

(12) United States Patent
Uno

(10) Patent No.: US 12,576,735 B2
(45) Date of Patent: Mar. 17, 2026

(54) CHARGE AND DISCHARGE SYSTEM, VEHICLE, AND CONTROL METHOD FOR CHARGE AND DISCHARGE SYSTEM

(71) Applicant: TOYOTA JIDOSHA KABUSHIKI KAISHA, Toyota (JP)

(72) Inventor: Yoshiyuki Uno, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 711 days.

(21) Appl. No.: 18/075,893

(22) Filed: Dec. 6, 2022

(65) Prior Publication Data

US 2023/0249565 A1 Aug. 10, 2023

(30) Foreign Application Priority Data

Feb. 8, 2022 (JP) ................................. 2022-017880

(51) Int. Cl.
*H02J 7/00* (2026.01)
*B60L 53/16* (2019.01)
*B60L 53/22* (2019.01)
*B60L 53/24* (2019.01)
*H02J 7/02* (2016.01)
*H02J 7/14* (2006.01)

(52) U.S. Cl.
CPC .............. *B60L 53/22* (2019.02); *B60L 53/16* (2019.02); *B60L 53/24* (2019.02); *H02J 7/0013* (2013.01); *H02J 7/007* (2013.01); *H02J 7/02* (2013.01); *B60L 2210/10* (2013.01); *H02J 2207/20* (2020.01)

(58) Field of Classification Search
CPC .......... B60L 53/16; B60L 53/22; B60L 53/24; B60L 2210/10; H02J 7/0013; H02J 7/007; H02J 7/02; H02J 2207/20
USPC ....................................................... 320/132
See application file for complete search history.

(56) References Cited

U.S. PATENT DOCUMENTS

| | | | | |
|---|---|---|---|---|
| 8,028,780 B2 * | 10/2011 | Sagawa | ................... | B60L 53/65 903/930 |
| 2008/0316774 A1 | 12/2008 | Ito et al. | | |
| 2009/0079389 A1 * | 3/2009 | Ohtomo | ................. | B60L 50/16 320/109 |

(Continued)

FOREIGN PATENT DOCUMENTS

| | | |
|---|---|---|
| JP | 2008-312395 A | 12/2008 |
| JP | 2012-130154 A | 7/2012 |
| JP | 2013-240191 A | 11/2013 |

*Primary Examiner* — Alexis B Pacheco
(74) *Attorney, Agent, or Firm* — Dinsmore & Shohl LLP

(57) ABSTRACT

A charge and discharge system capable of being charged and discharged from and to an external device includes a charge and discharge circuit, a switching system and a controller. The charge and discharge circuit converts electric power from an inlet to direct-current power compatible with an electrical storage device and converts direct-current power of the electrical storage device to electric power that is discharged from an outlet. The switching system connects the charge and discharge circuit to the inlet or to the outlet. The controller determines that the switching system has a failure on condition that an alternating-current voltage has been detected at the inlet and an alternating-current voltage has been detected at the outlet, and disable charging and discharging.

7 Claims, 5 Drawing Sheets

(56)     References Cited

U.S. PATENT DOCUMENTS

| | | | |
|---|---|---|---|
| 2010/0194354 A1* | 8/2010 | Gotou | B60L 53/14 |
| | | | 320/111 |
| 2011/0216451 A1* | 9/2011 | Haines | H02H 3/338 |
| | | | 361/93.6 |
| 2012/0025765 A1* | 2/2012 | Frey | B60L 3/0069 |
| | | | 320/109 |
| 2013/0009598 A1* | 1/2013 | Ohtomo | B60L 53/00 |
| | | | 320/109 |
| 2015/0137755 A1* | 5/2015 | Sadano | B60L 53/16 |
| | | | 320/109 |
| 2015/0241500 A1* | 8/2015 | Mochizuki | B60L 3/04 |
| | | | 324/418 |
| 2016/0072341 A1* | 3/2016 | Tamura | H02J 9/061 |
| | | | 307/66 |
| 2017/0092023 A1* | 3/2017 | Ishii | G07C 5/0816 |
| 2018/0006340 A1* | 1/2018 | Yamamoto | B60L 3/0084 |
| 2019/0184849 A1* | 6/2019 | Lim | B60L 53/18 |
| 2020/0086755 A1* | 3/2020 | Maruyama | B60L 53/60 |
| 2020/0185936 A1* | 6/2020 | Oishi | H02J 7/0024 |
| 2020/0276908 A1* | 9/2020 | Lim | B60L 53/18 |
| 2022/0120823 A1* | 4/2022 | Nakayama | H02H 3/05 |
| 2022/0219549 A1* | 7/2022 | Slepchenkov | B60L 58/21 |
| 2023/0025134 A1* | 1/2023 | Kim | H02M 1/4233 |
| 2023/0280384 A1* | 9/2023 | Al | B60L 53/60 |
| | | | 324/537 |
| 2023/0311678 A1* | 10/2023 | Paryani | B60L 53/10 |
| | | | 307/10.7 |
| 2024/0083253 A1* | 3/2024 | Wesenauer | B60L 3/0046 |

* cited by examiner

FIG. 3

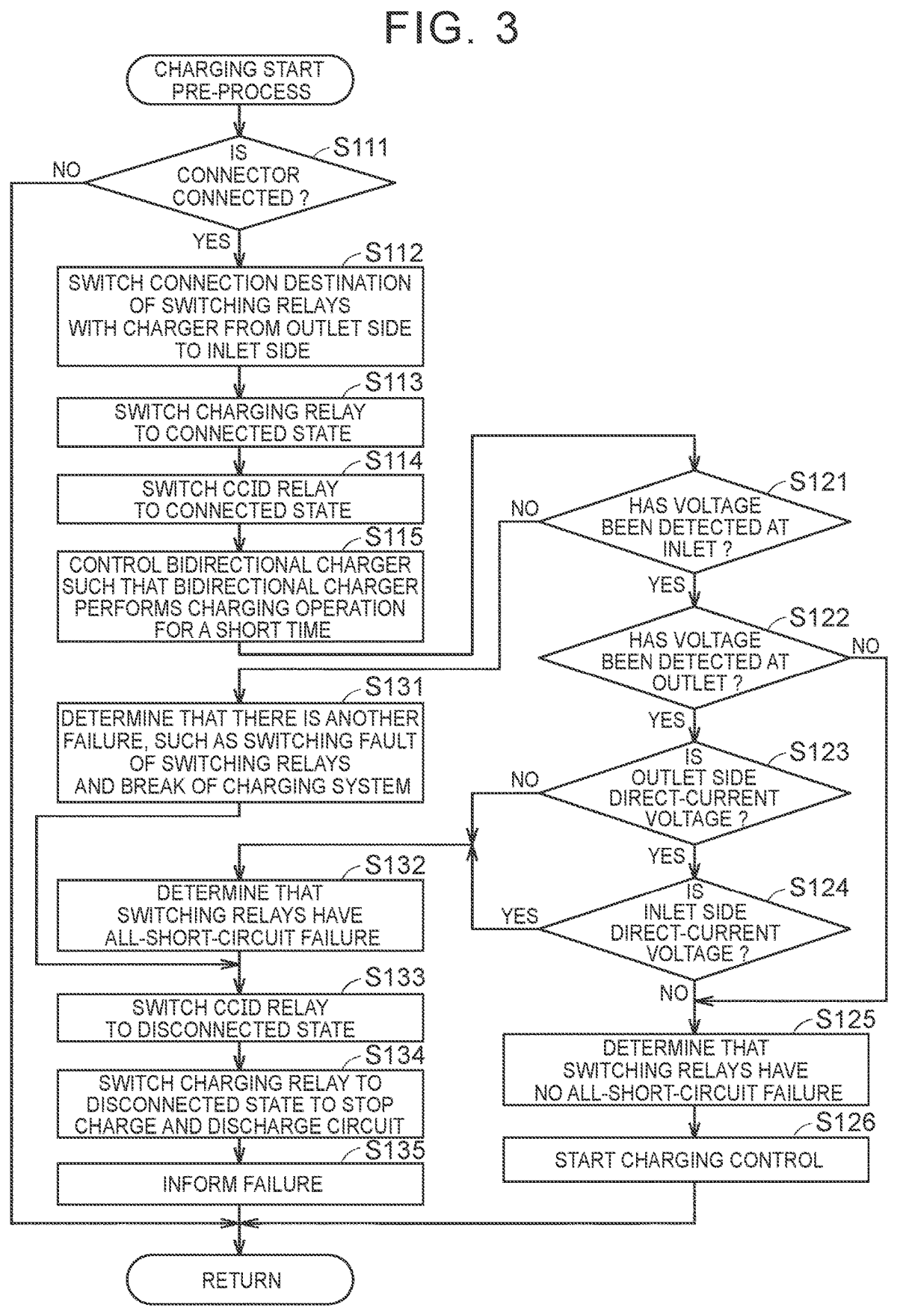

```
        ┌─────────────────────┐
        │   CHARGING START    │
        │    PRE-PROCESS      │
        └─────────────────────┘
                  │
                  ▼
              ╱─────────╲  S111
   NO       ╱     IS      ╲
 ◀─────────◁   CONNECTOR   ▷
            ╲  CONNECTED ? ╱
              ╲─────────╱
                  │ YES
                  ▼              S112
   ┌────────────────────────────────┐
   │ SWITCH CONNECTION DESTINATION   │
   │    OF SWITCHING RELAYS          │
   │ WITH CHARGER FROM OUTLET SIDE   │
   │        TO INLET SIDE            │
   └────────────────────────────────┘
                  │              S113
                  ▼
   ┌────────────────────────────────┐
   │    SWITCH CHARGING RELAY        │
   │     TO CONNECTED STATE          │
   └────────────────────────────────┘
                  │              S114
                  ▼
   ┌────────────────────────────────┐
   │     SWITCH CCID RELAY           │
   │     TO CONNECTED STATE          │
   └────────────────────────────────┘
                  │              S115
                  ▼
   ┌────────────────────────────────┐
   │ CONTROL BIDIRECTIONAL CHARGER   │
   │ SUCH THAT BIDIRECTIONAL CHARGER │
   │  PERFORMS CHARGING OPERATION    │
   │        FOR A SHORT TIME         │
   └────────────────────────────────┘
```

S121: HAS VOLTAGE BEEN DETECTED AT INLET ?  — NO / YES

S122: HAS VOLTAGE BEEN DETECTED AT OUTLET ?  — YES / NO

S123: IS OUTLET SIDE DIRECT-CURRENT VOLTAGE ?  — NO / YES

S124: IS INLET SIDE DIRECT-CURRENT VOLTAGE ?  — YES / NO

S131: DETERMINE THAT THERE IS ANOTHER FAILURE, SUCH AS SWITCHING FAULT OF SWITCHING RELAYS AND BREAK OF CHARGING SYSTEM

S132: DETERMINE THAT SWITCHING RELAYS HAVE ALL-SHORT-CIRCUIT FAILURE

S133: SWITCH CCID RELAY TO DISCONNECTED STATE

S134: SWITCH CHARGING RELAY TO DISCONNECTED STATE TO STOP CHARGE AND DISCHARGE CIRCUIT

S135: INFORM FAILURE

S125: DETERMINE THAT SWITCHING RELAYS HAVE NO ALL-SHORT-CIRCUIT FAILURE

S126: START CHARGING CONTROL

RETURN

CHARGE AND DISCHARGE SYSTEM, VEHICLE, AND CONTROL METHOD FOR CHARGE AND DISCHARGE SYSTEM

CROSS-REFERENCE TO RELATED APPLICATION

This application claims priority to Japanese Patent Application No. 2022-017880 filed on Feb. 8, 2022, incorporated herein by reference in its entirety.

BACKGROUND

1. Technical Field

The disclosure relates to a charge and discharge system, a vehicle, and a control method for a charge and discharge system and, particularly, to a charge and discharge system capable of performing charging and discharging from and to an external device, a vehicle that includes the charge and discharge system, and a control method for the charge and discharge system.

2. Description of Related Art

There has been a power supply system capable of charging a main battery and an auxiliary battery from a system power supply and capable of outputting electric power for electric home appliances by using the main battery as a power supply without an exclusive DC/AC converter (see, for example, Japanese Unexamined Patent Application Publication No. 2008-312395 (JP 2008-312395 A)). The power supply system described in JP 2008-312395 A includes a plug to which electric power is input during charging and a receptacle from which electric power is output during feeding. Connection of two power lines for connecting the power supply system with the plug or the receptacle is switched by a C-contact relay. A C-contact relay is a relay in which, when a current is flowing through a coil, a common contact and a normally open contact are connected and the common contact and a normally closed contact are cut off, while, when no current is flowing through the coil, the common contact and the normally closed contact are connected and the common contact and the normally open contact are disconnected.

SUMMARY

However, in the power supply system described in JP 2008-312395 A, if there occurs an all-short-circuit failure that all the three terminals, that is, the common contact, normally open contact, and normally closed contact of the C-contact relay, an electric power not supported by a device connected to the receptacle (outlet) can be applied to the device from the plug (inlet) via the receptacle (outlet).

The disclosure provides a charge and discharge system, a vehicle, and a control method for a charge and discharge system, which are capable of reducing the possibility that an electric power not supported by a device connected to an outlet is applied to the device.

An aspect of the disclosure provides a charge and discharge system. The charge and discharge system is capable of performing charging and discharging from and to an external device. The charge and discharge system includes a charge and discharge circuit configured to convert electric power from an inlet to direct-current power compatible with an electrical storage device configured to store electric power and convert direct-current power of the electrical storage device to electric power that is discharged from an outlet; a switching system configured to switch between a state where the charge and discharge circuit and the inlet are electrically connected and a state where the charge and discharge circuit and the outlet are electrically connected; a controller configured to control the switching system; a first voltage sensor configured to detect an alternating-current voltage at the inlet; and a second voltage sensor configured to detect an alternating-current voltage at the outlet. The inlet is connected to a connector that supplies electric power from an external device. The outlet is connected to a plug that discharges electric power to an external device. The controller is configured to determine that the switching system has a failure on condition that an alternating-current voltage has been detected by the first voltage sensor at the inlet and an alternating-current voltage has been detected by the second voltage sensor at the outlet, and disable charging and discharging.

When an alternating-current voltage has been detected at the inlet and an alternating-current voltage has been detected at the outlet, it is presumable that the inlet and the outlet are electrically continuous. With such a configuration, when an alternating-current voltage has been detected at the inlet and an alternating-current voltage has been detected at the outlet, it is determined that the switching system has a failure, and charging and discharging are disabled. As a result, it is possible to provide a charge and discharge system capable of reducing the possibility that an electric power not supported by a device connected to the outlet is applied to the device.

The controller may be configured to disable charging and discharging by controlling the charge and discharge circuit such that conversion of electric power is not performed.

With such a configuration, application of electric power from the electrical storage device via the charge and discharge circuit to the device connected to the outlet is prevented.

The controller may be configured to disable charging and discharging by disabling supply of electric power from an external apparatus that supplies electric power to the inlet.

With such a configuration, application of electric power from the external apparatus, which supplies electric power, via the inlet to the device connected to the outlet is prevented.

The second voltage sensor may be configured to be capable of detecting not only an alternating-current voltage but also a direct-current voltage at the outlet, and the controller may be configured to determine that the switching system has no failure on condition that an alternating-current voltage has been detected by the first voltage sensor at the inlet and a direct-current voltage has been detected by the second voltage sensor at the outlet, and enable charging and discharging.

Although an alternating-current voltage input from the inlet is not applied to the outlet, a voltage can be detected at the outlet side due to electric charge remaining in a capacitor of the device connected to the outlet. With such a configuration, when the detected voltage at the outlet is a direct-current voltage, it may be determined that an alternating-current voltage at the inlet is not applied to the outlet, so it is determined that the switching system has no failure. As a result, it is possible to determine that the switching system has no failure and enable charging and discharging when an alternating-current voltage has been detected at the inlet and a direct-current voltage has been detected at the outlet.

The first voltage sensor may be configured to be capable of detecting not only an alternating-current voltage but also a direct-current voltage at the inlet, and the controller may be configured to determine that the switching system has a failure on condition that a direct-current voltage has been detected by the first voltage sensor at the inlet and a direct-current voltage has been detected by the second voltage sensor at the outlet, and disable charging and discharging.

A voltage can be detected at the outlet side due to electric charge remaining in a capacitor of the device connected to the outlet. With such a configuration, when the detected voltage at the outlet is direct current and the detected voltage at the inlet is direct current, it may be determined that a direct-current voltage at the outlet is applied to the inlet, so it may be determined that the switching system has a failure. As a result, it is possible to determine that the switching system has a failure when a direct-current voltage has been detected at the inlet and a direct-current voltage has been detected at the outlet, and disable charging and discharging.

Another aspect of the disclosure provides a vehicle. The vehicle may include the above-described charge and discharge system, the inlet, the outlet, and the electrical storage device. With such a configuration, it is possible to provide a vehicle capable of reducing the possibility that an electric power not supported by a device connected to the outlet is applied to the device.

Further another aspect of the disclosure provides a control method for a charge and discharge system capable of performing charging and discharging from and to an external apparatus. The charge and discharge system includes a charge and discharge circuit configured to convert electric power from an inlet to direct-current power compatible with an electrical storage device configured to store electric power and convert direct-current power of the electrical storage device to electric power that is discharged from an outlet; a switching system configured to switch between a state where the charge and discharge circuit and the inlet are electrically connected and a state where the charge and discharge circuit and the outlet are electrically connected; a controller configured to control the switching system; a first voltage sensor configured to detect a voltage of electric power at the inlet; and a second voltage sensor configured to detect a voltage of electric power at the outlet. The inlet is connected to a connector that supplies electric power from an external device. The outlet is connected to a plug that discharges electric power to an external device. The control method includes, by the controller, determining that the switching system has a failure on condition that an alternating-current voltage has been detected by the first voltage sensor at the inlet and an alternating-current voltage has been detected by the second voltage sensor at the outlet; and disabling charging and discharging when it is determined that the switching system has a failure.

With such a configuration, it is possible to provide a control method for a charge and discharge system, capable of reducing the possibility that an electric power not supported by a device connected to the outlet is applied to the device.

According to the aspects of the disclosure, it is possible to provide a charge and discharge system, a vehicle, and a control method for a charge and discharge system, which are capable of reducing the possibility that an electric power not supported by a device connected to an outlet is applied to the device.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a flowchart showing the flow of a charging start pre-process according to a first embodiment;

DETAILED DESCRIPTION OF EMBODIMENTS

First Embodiment

Figure 1:
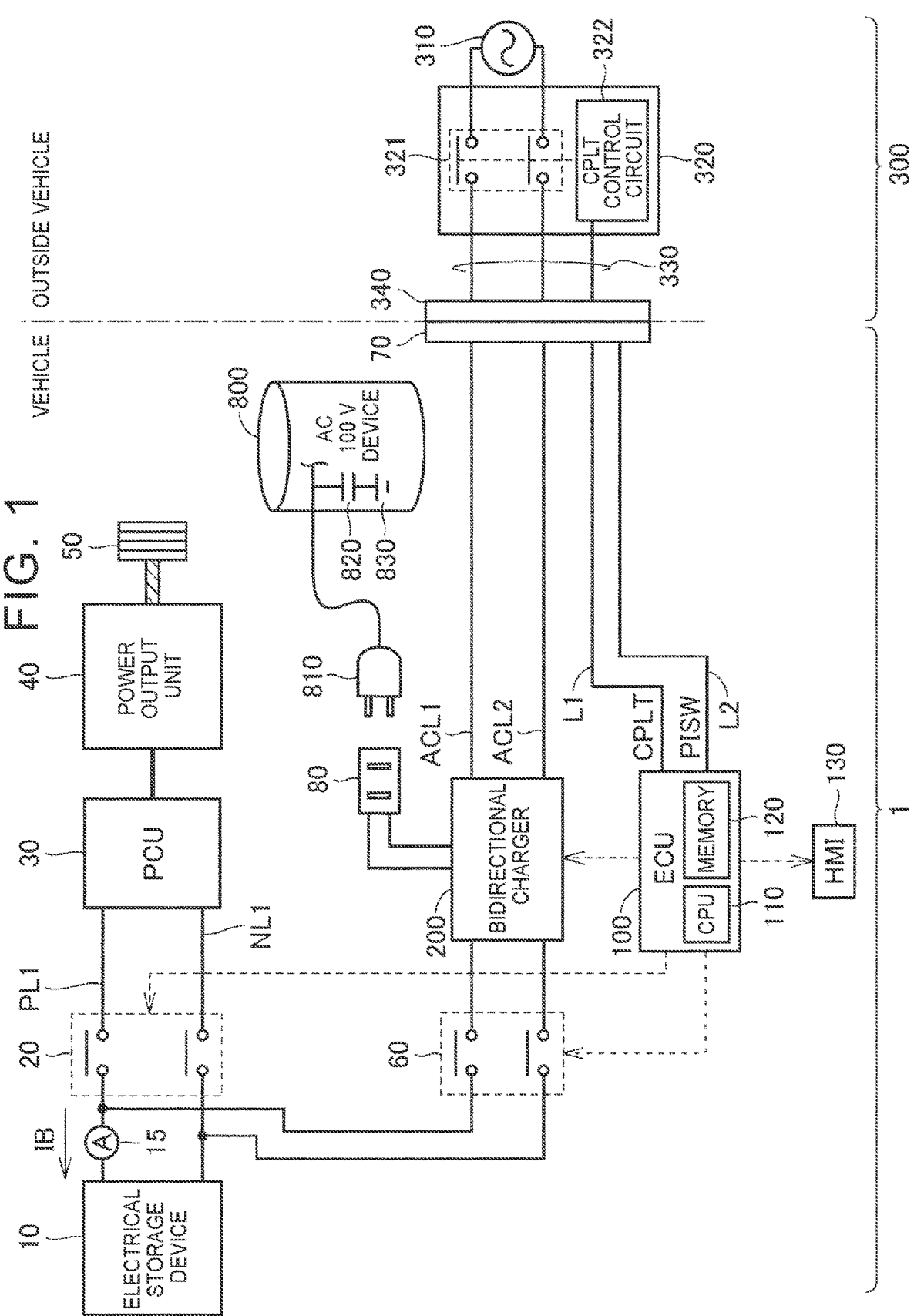
FIG. 1 is a diagram showing an example of the overall configuration of a charging system that includes a vehicle provided with a bidirectional charger and a power supply facility according to an embodiment.

Hereinafter, an embodiment of the disclosure will be described in detail with reference to the accompanying drawings. Like reference signs denote the same or corresponding portions in the drawings, and the description thereof will not be repeated.

Configuration of Vehicle and Power Supply Facility

FIG. 1 is a diagram showing an example of the overall configuration of a charging system that includes a vehicle 1 provided with a bidirectional charger 200 and a power supply facility 300 according to the embodiment. As shown in FIG. 1, the charging system includes the vehicle 1 and the power supply facility 300. The power supply facility 300 is a facility for supplying alternating-current power to the vehicle 1. An example in which the vehicle 1 according to the present embodiment is a battery electric vehicle (hereinafter, also referred to as BEV) will be described.

The vehicle 1 includes an electrical storage device 10, a current sensor 15, a system main relay (hereinafter, also referred to as SMR) 20, a power control unit (hereinafter, also referred to as PCU) 30, a power output unit 40, a drive wheel 50, an inlet 70, a charging relay 60, the bidirectional charger 200, an outlet 80, an electronic control unit (ECU) 100, and a human machine interface (HMI) 130.

The electrical storage device 10 is a rechargeable direct-current power supply and is, for example, a nickel-metal hydride secondary battery, a lithium ion secondary battery, or the like. The electrical storage device 10 stores not only electric power supplied from an alternating-current power supply 310 of the power supply facility 300 but also electric power generated by the power output unit 40. A large-capacitance capacitor may also be employed as the electrical storage device 10.

The current sensor 15 detects a charging current D3 input to or output from the electrical storage device 10 and outputs a detection result to the ECU 100.

The SMR 20 is provided between the electrical storage device 10 and power lines PL1, NL1. The SMR 20 is a relay used to electrically connect the electrical storage device 10 to the power lines PL1, NL1 or electrically disconnect the electrical storage device from the power lines PL1, NL1.

The PCU 30 is a collection of power conversion devices for driving the power output unit 40 by using electric power supplied from the electrical storage device 10. The PCU 30 includes, for example, an inverter for driving a motor included in the power output unit 40, a converter that steps up electric power output from the electrical storage device 10, and the like.

The power output unit 40 is a collection of devices for driving the drive wheel 50. The power output unit 40 includes, for example, a motor generator or the like that drives the drive wheel 50. The power output unit 40 generates electric power during, for example, braking of the vehicle 1 with the motor generator that drives the drive wheel 50 and outputs the generated electric power to the PCU 30.

The inlet 70 is electrically connected to input lines ACL1, ACL2 of the bidirectional charger 200. The inlet 70 is configured to be able to connect with a connector 340 of the power supply facility 300. Signal lines L1, L2 are provided between the inlet 70 and the ECU 100. The signal line L1 is a signal line for transmitting a pilot signal CPLT for exchanging predetermined information between the vehicle 1 and the power supply facility 300. The signal line L2 is a signal line for transmitting a connector connection signal PISW that indicates the connection status between the inlet 70 and the connector 340.

In the present embodiment, the outlet 80 is a receptacle for alternating-current 100 V and is configured to be able to connect with a plug 810 of a device 800 that operates on 100 V alternating-current power. As shown in FIG. 1, in the device 800, a capacitor 820 can be connected to power lines connected to the plug 810. The other end of the capacitor 820 is connected to a ground 830. The outlet 80 is electrically connected to the bidirectional charger 200.

The charging relay 60 is a relay used to connect the bidirectional charger 200 to the power lines PL1, NL1 or electrically disconnect the bidirectional charger 200 from the power lines PL1, NL1. The charging relay 60 switches the open-closed state based on a control signal from the ECU 100.

The bidirectional charger 200 is electrically connected to the electrical storage device 10 via the charging relay 60. The bidirectional charger 200, in accordance with a command from the ECU 100, converts alternating-current power input to the inlet 70 to direct-current power having a charging voltage of the electrical storage device 10 or converts the direct-current power of the electrical storage device 10 to alternating-current power output from the outlet 80. Direct-current power converted by the bidirectional charger 200 from alternating-current power coming from the inlet 70 is supplied to the electrical storage device 10 via the charging relay 60 to charge the electrical storage device 10. Alternating-current power converted by the bidirectional charger 200 from direct-current power coming from the electrical storage device 10 is supplied via the outlet 80 to the device 800 connected to the outlet 80.

The ECU 100 is configured to include a central processing unit (CPU) 110, a memory 120, and an input-output buffer (not shown) for inputting or outputting various signals. The memory 120 includes a random access memory (RAM), and a read only memory (ROM). The CPU 110 expands a program stored in the ROM onto the RAM and runs the program. The program stored in the ROM describes a process that is executed by the CPU 110. The ECU 100 uses the CPU 110 to execute a predetermined computation process based on various signals input from the input-output buffer and information stored in the memory 120 in accordance with the program, and controls the devices (the SMR 20, the PCU 30, the charging relay 60, the bidirectional charger 200, and the like) based on the computation result such that the vehicle 1 becomes a desired state. These controls are not limited to software processing and may be processed by constructing exclusive hardware (electronic circuit).

The HMI 130 is controlled by the ECU 100 to display predetermined information or inform a user by voice in response to running of a program.

The power supply facility 300 includes the alternating-current power supply 310 outside the vehicle, electric vehicle supply equipment (EVSE) 320, and a charging cable 330. The connector 340 configured to be able to connect with the inlet 70 of the vehicle 1 is provided at the distal end of the charging cable 330.

The alternating-current power supply 310 is made up of, for example, a commercial system power supply; however, the alternating-current power supply 310 is not limited thereto. Various power supplies are applicable.

The EVSE 320 controls supply and cut-off of alternating-current power to the vehicle 1 from the alternating-current power supply 310 via the charging cable 330. The EVSE 320 is provided in, for example, a charging station for supplying electric power to the vehicle 1. The EVSE 320 is to meet, for example, required specifications of "SAEJ1772 (SAE Electric Vehicle Conductive Charge Coupler) standard". The function of the EVSE 320 is not limited to being provided in a charging station. Alternatively, for example, a charging circuit interrupt device (CCID) box having the function of the EVSE 320 may be provided in a charging cable. In this case, for example, a receptacle plug provided at one end (opposite side to the connector 340) of the charging cable is connected to the alternating-current power supply 310.

The EVSE 320 includes a CCID 321 and a CPLT control circuit 322. The CCID 321 is a relay provided in a power supply path from the alternating-current power supply 310 to the vehicle 1 and is controlled by the CPLT control circuit 322. In this embodiment, the EVSE 320 of the power supply facility 300 is assumed to be able to supply 200 V alternating-current power to the vehicle 1.

The CPLT control circuit 322 generates a pilot signal CPLT to be communicated with the ECU 100 of the vehicle 1 and outputs the pilot signal CPLT to the ECU 100 through an exclusive signal line included in the charging cable 330. The potential of the pilot signal CPLT is controlled by the ECU 100. The CPLT control circuit 322 controls the CCID 321 based on the potential of the pilot signal CPLT. In other words, by operating the potential of the pilot signal CPLT in the ECU 100, it is possible to remotely operate the CCID 321 from the ECU 100.

Figure 2:
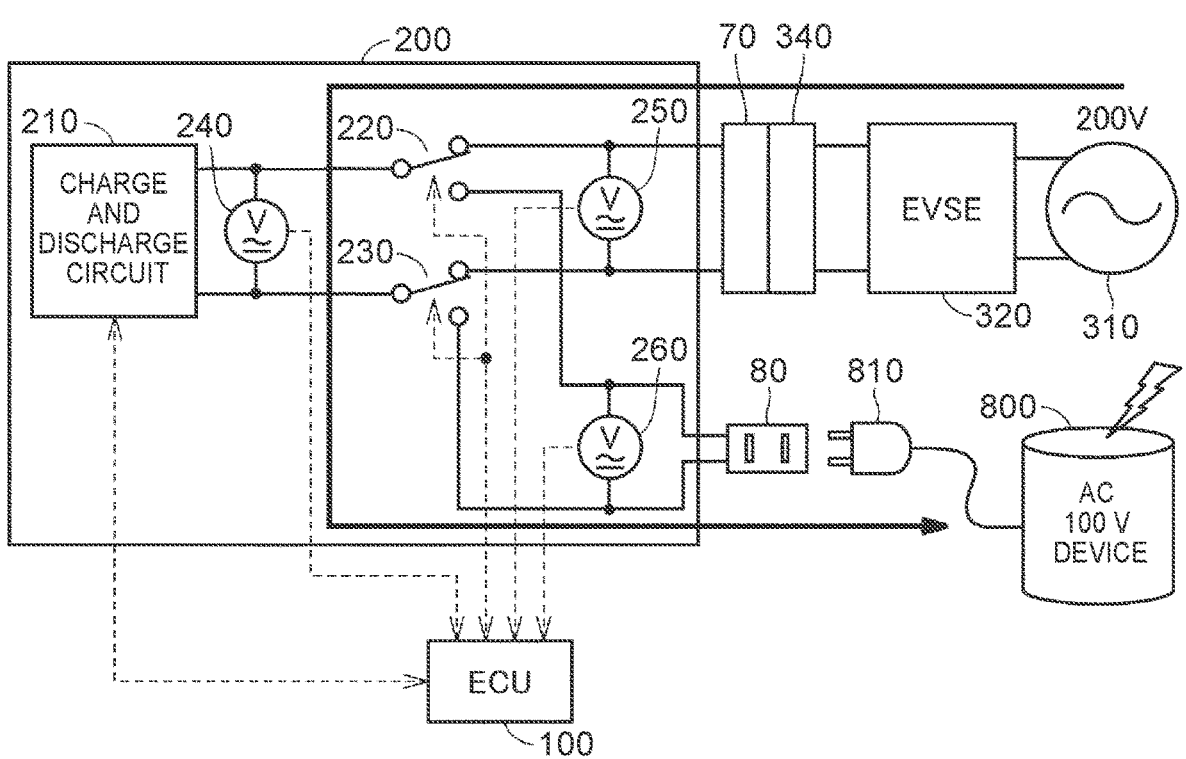
FIG. 2 is a diagram showing an example of the configuration of the bidirectional charger according to the embodiment.

FIG. 2 is a diagram showing an example of the configuration of the bidirectional charger 200 according to the embodiment. As shown in FIG. 2, the bidirectional charger 200 includes the charge and discharge circuit 210, switching relays 220, 230, and voltage sensors 240, 250, 260 for both alternating current and direct current.

The charge and discharge circuit 210, in accordance with a control signal from the ECU 100, converts alternating-current power from the inlet 70 to direct-current power compatible with the electrical storage device 10 or converts the direct-current power of the electrical storage device 10 to electric power output that is discharged from the outlet 80.

Each of the switching relays 220, 230 is a C-contact relay in this embodiment. The switching relays 220, 230 make up a switching system that switches, in accordance with a control signal from the ECU 100, between a state where the charge and discharge circuit 210 and the inlet 70 are electrically connected and a state where the charge and discharge circuit 210 and the outlet 80 are electrically connected. Specifically, the common contacts of the switching relays 220, 230 are respectively connected to two terminals of the charge and discharge circuit 210, the normally closed contacts of the switching relays 220, 230 are respectively connected to two terminals of the inlet 70, and the normally open contacts of the switching relays 220, 230 are respectively connected to two terminals of the outlet 80.

The voltage sensor 240 detects a direct-current voltage and an alternating-current voltage between the power lines provided between the charge and discharge circuit 210 and both the switching relays 220, 230, and outputs signals indicating the detected type (direct current or alternating current) and voltage value of electric power to the ECU 100.

The voltage sensor 250 detects a direct-current voltage and an alternating-current voltage between the power lines provided between the inlet 70 and both the switching relays 220, 230, and outputs signals indicating the detected type (direct current or alternating current) and voltage value of electric power to the ECU 100.

The voltage sensor 260 detects a direct-current voltage and an alternating-current voltage between the power lines provided between the outlet 80 and both the switching relays 220, 230, and outputs signals indicating the detected type (direct current or alternating current) and voltage value of electric power to the ECU 100.

In the bidirectional charger 200, if there occurs an all-short-circuit failure that all the three terminals, that is, the common contact, normally open contact, and normally closed contact of each of the switching relays 220, 230 that are the C-contact relays, there is a possibility that electric power not supported by the device 800 can be applied from the inlet 70 via the outlet 80 to the device 800 connected to the outlet 80.

The ECU 100 determines that the switching relays 220, 230 have a failure on condition that an alternating-current voltage has been detected by the voltage sensor 250 at the inlet 70 and an alternating-current voltage has been detected by the voltage sensor 260 at the outlet 80, and disables charging and discharging.

When an alternating-current voltage has been detected at the inlet 70 and an alternating-current voltage has been detected at the outlet 80, it is presumable that the inlet 70 and the outlet 80 are electrically continuous. With the above-described configuration, when an alternating-current voltage has been detected at the inlet 70 and an alternating-current voltage has been detected at the outlet 80, it is determined that the switching relays 220, 230 have a failure, and charging and discharging are disabled. As a result, it is possible to reduce the possibility that an electric power not supported by the device 800 connected to the outlet 80 is applied to the device 800.

FIG. 3 is a flowchart showing the flow of a charging start pre-process according to a first embodiment. As shown in FIG. 3, the charging start pre-process is called and executed at predetermined intervals from a higher-level process by the CPU 110 of the ECU 100.

The CPU 110 uses a connector connection signal PISW to determine whether the connector 340 is connected to the inlet 70 (step S111). When the CPU 110 determines that the connector 340 is not connected (NO in step S111), the CPU 110 returns the process of the charging start pre-process to the higher-level calling process.

On the other hand, when the CPU 110 determines that the connector 340 is connected (YES in step S111), the CPU 110 switches the connection destination of the switching relays 220, 230 that are C-contact relays to the bidirectional charger 200 from the outlet 80 side to the inlet 70 side (step S112).

Subsequently, the CPU 110 switches the charging relay 60 into a connected state (step S113) and switches the CCID 321 into a connected state (step S114). After that, the CPU 110 controls the bidirectional charger 200 such that the bidirectional charger 200 performs charging operation for a short time until failure determination of the switching relays 220, 230, which will be described below, ends (step S115).

The CPU 110 determines whether a voltage has been detected at the inlet 70 by using a signal from the voltage sensor 250 (step S121). When the CPU 110 determines that no voltage has been detected at the inlet 70 (NO in step S121), that is, when no voltage is applied at the inlet 70 although the connector 340 is connected and electric power is being supplied from the power supply facility 300 via the connector 340 to the inlet 70 of the vehicle 1, the CPU 110 determines that there is another failure (step S131). Another failure is a failure other than a failure of the switching relays 220, 230, such as a failure to switch from the outlet 80 side of the switching relays 220, 230 to the inlet 70 side and a break of a charging system from the power supply facility 300 to the vehicle 1.

When the CPU 110 determines that a voltage has been detected at the inlet 70 (YES in step S121), the CPU 110 determines whether a voltage has been detected at the outlet 80 by using a signal from the voltage sensor 260 (step S122).

When the CPU 110 determines that a voltage has been detected at the outlet 80 (YES in step S122), the CPU 110 determines whether the outlet 80-side voltage is a direct-current voltage by using a signal from the voltage sensor 260 (step S123).

When the CPU 110 determines that the outlet 80-side voltage is a direct-current voltage (YES in step S123), the CPU 110 determines whether the inlet 70-side voltage is a direct-current voltage by using a signal from the voltage sensor 250 (step S124).

When the CPU 110 determines that no voltage has been detected at the outlet 80 (NO in step S122) or when the CPU 110 determines that the inlet 70-side voltage is not a direct-current voltage (NO in step S124), the CPU 110 determines that the switching relays 220, 230 do not have an all-short-circuit failure (step S125) and controls the bidirectional charger 200 such that the bidirectional charger 200 starts charging control (step S126). After step S126, the CPU 110 returns the process of the charging start pre-process to the calling process.

When the CPU 110 determines that the outlet 80-side voltage is not a direct-current voltage (NO in step S123) or when the CPU 110 determines that the inlet 70-side voltage is a direct-current voltage (YES in step S124), the CPU 110 determines that the switching relays 220, 230 have an all-short-circuit failure (step S132).

After step S131 or step S132, the CPU 110 switches the CCID 321 into a disconnected state (step S133), switches the charging relay 60 into a disconnected state, and stops the charge and discharge circuit 210 (step S134). Then, the CPU 110 controls the HMI 130 such that the HMI 130 informs the details of the failure (step S135). After step S135, the CPU 110 returns the process of the charging start pre-process to the calling process.

Second Embodiment

In the first embodiment, whether to determine that the switching relays 220, 230 have a failure is branched off as shown in step S121, step S122, step S123, and step S124 in FIG. 3, in accordance with a voltage at the inlet 70 and a voltage at the outlet 80. In a second embodiment, as will be described below with reference to FIG. 4, whether the switching relays 220, 230 have a failure is branched off.

Figure 4:
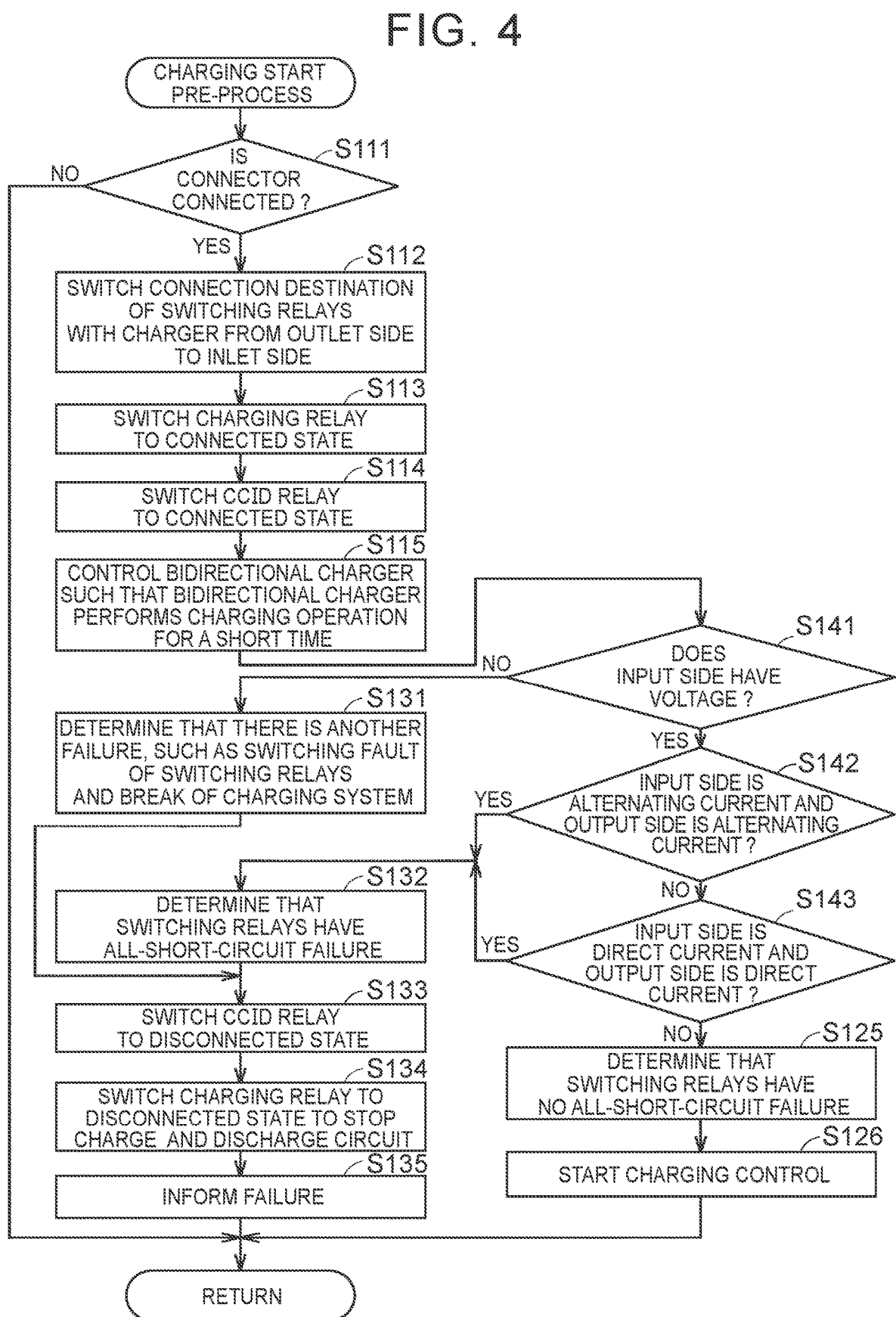
FIG. 4 is a flowchart showing the flow of a charging start pre-process according to a second embodiment.

FIG. 4 is a flowchart showing the flow of a charging start pre-process according to the second embodiment. As shown in FIG. 4, the charging start pre-process is called and executed at predetermined intervals from a higher-level process by the CPU 110 of the ECU 100. Processes other than step S141, step S142, and step S143 in FIG. 4 are the same as those of FIG. 3, so the description will not be repeated.

After step S115, the CPU 110 determines whether a voltage has been detected at the inlet 70 by using a signal from the voltage sensor 250 (step S141). When the CPU 110 determines that no voltage has been detected at the inlet 70 side (NO in step S141), the CPU 110 proceeds with the process to the processes of step S131 and the subsequent processes, described with reference to FIG. 3.

When the CPU 110 determines that a voltage has been detected at the inlet 70 (YES in step S141), the CPU 110 determines whether the inlet 70 side is alternating current and the outlet 80 side is alternating current (step S142).

When the CPU 110 determines that at least any one of the inlet 70 side and the outlet 80 side is not alternating current (NO in step S142), the CPU 110 determines whether the inlet 70 side is direct current and the outlet 80 side is direct current (step S143).

When the CPU 110 determines that the inlet 70 side is alternating current and the outlet 80 side is alternating current (YES in step S142) or when the inlet 70 side is direct current and the outlet 80 side is direct current (YES in step S143), the CPU 110 proceeds with the process to the processes of step S132 and the subsequent processes, described with reference to FIG. 3.

When the CPU 110 determines that at least any one of the inlet 70 side and the outlet 80 side is not direct current (NO in step S143), that is, when the inlet 70 side is alternating current and the outlet 80 side is direct current or when the inlet 70 side is alternating current and no voltage is applied at the outlet 80 side, the CPU 110 proceeds with the process to the processes of step S125 and the subsequent processes, described with reference to FIG. 3.

Third Embodiment

In the above-described first embodiment and second embodiment, as described with reference to FIG. 2, the switching system that switches between a state where the charge and discharge circuit 210 and the inlet 70 are electrically connected and a state where the charge and discharge circuit 210 and the outlet 80 are electrically connected in accordance with a control signal from the ECU 100 is made up of the switching relays 220, 230 that are two C-contact relays. In a third embodiment, the switching system is made up of two A-contact relays and two B-contact relays.

Figure 5:
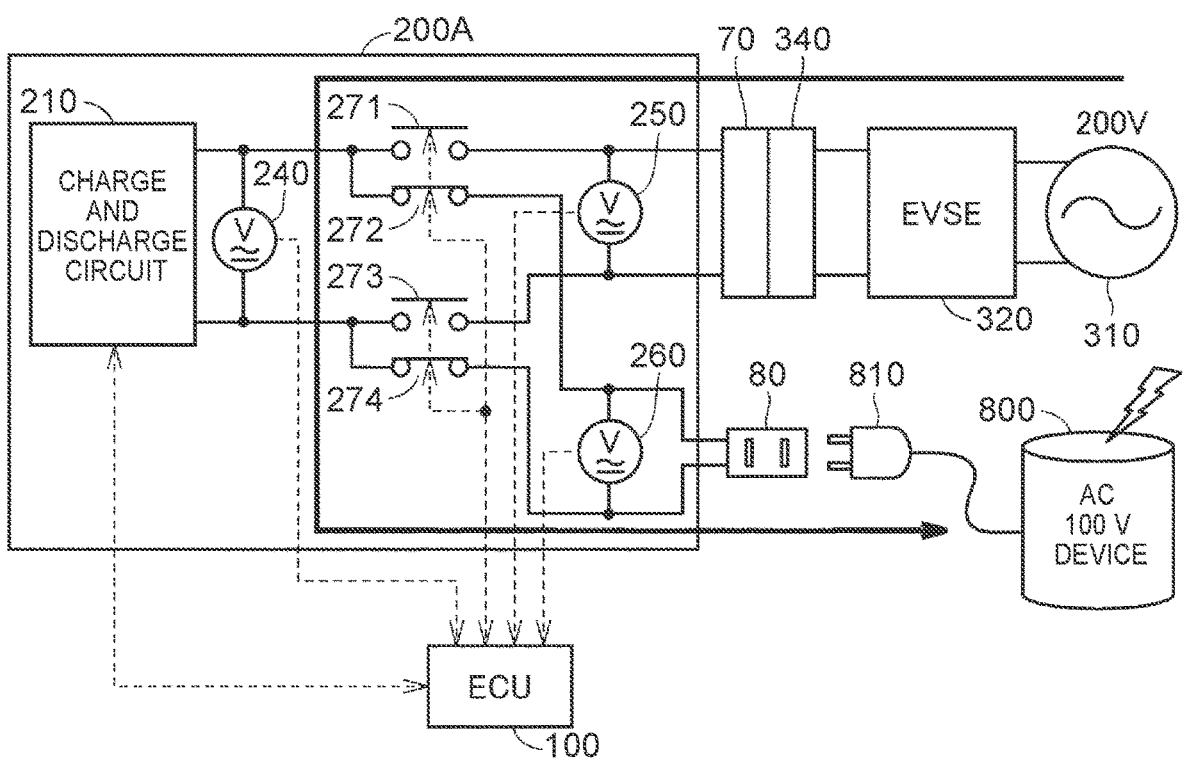
FIG. 5 is a diagram showing an example of the configuration of a bidirectional charger according to a third embodiment.

FIG. 5 is a diagram showing an example of the configuration of a bidirectional charger 200A according to the third embodiment. Components other than switching relays 271, 272, 273, 274 of the bidirectional charger 200A are similar to those of the bidirectional charger 200 described with reference to FIG. 2, so the description will not be repeated.

Each of the switching relays 271, 273 is an A-contact relay in this embodiment. Each of the switching relays 272, 274 is a B-contact relay in this embodiment. An A-contact relay is a relay in which, when a current is flowing through a coil, a common contact and a normally open contact are connected, and, when no current is flowing through the coil, the common contact and the normally open contact are disconnected. A B-contact relay is a relay in which, when a current is flowing through a coil, a common contact and a normally closed contact are connected, and, when no current is flowing through the coil, the common contact and the normally closed contact are disconnected.

The switching relays 271, 272, 273, 274 make up a switching system that switches, in accordance with a control signal from the ECU 100, between a state where the charge and discharge circuit 210 and the inlet 70 are electrically connected and a state where the charge and discharge circuit 210 and the outlet 80 are electrically connected. Specifically, the common contact of the switching relays 271, 272 is connected to one of the terminals of the charge and discharge circuit 210, and the common contact of the switching relays 273, 274 is connected to the other one of the terminals of the charge and discharge circuit 210. The normally open terminals of the switching relays 271, 273 that are A-contact relays are respectively connected to two terminals of the inlet 70. The normally closed terminals of the switching relays 272, 274 that are B-contact relays are respectively connected to two terminals of the outlet 80.

In the third embodiment, in the process described with reference to step S112 of FIG. 3 and FIG. 4, the CPU 110 switches the common terminal connected to the charge and discharge circuit 210 and the normally open terminal connected to the inlet 70 into a connected state by passing current through the coils of the switching relays 271, 273 that are A-contact relays, and switches the common terminal connected to the charge and discharge circuit 210 and the normally closed terminal connected to the outlet 80 into a disconnected state by passing current through the coils of the switching relays 272, 274 that are B-contact relays. Thus, the destination to which the bidirectional charger 200 is connected is switched from the outlet 80 side to the inlet 70 side.

Other Modifications

In the above-described first embodiment, as shown in FIG. 1, the vehicle 1 is assumed as a BEV. However, the vehicle 1 is not limited thereto. The vehicle 1 just needs to be a vehicle capable of performing charging and discharging from and to an external device. The vehicle 1 may be a plug-in hybrid electric vehicle (hereinafter, also referred to as PHEV) or a fuel cell electric vehicle (FCEV) that has an external charging function. When the vehicle 1 is a PHEV, the power output unit 40 may include, for example, an engine in addition to a motor.

In the above-described embodiments, as shown in FIG. 1 and FIG. 2, alternating-current power is input from the inlet 70 for charging. Then, the charge and discharge circuit 210 of the bidirectional charger 200 converts the alternating-current power input from the inlet 70 to direct-current power of a voltage compatible with the electrical storage device 10, and outputs the direct-current power to the electrical storage device 10.

However, the configuration is not limited thereto. Direct-current power may be input from the inlet 70 for charging. Then, the charge and discharge circuit 210 of the bidirectional charger 200 may convert the direct-current power input from the inlet 70 to direct-current power of a voltage compatible with the electrical storage device 10, and outputs the direct-current power to the electrical storage device 10.

In the above-described embodiments, as shown in FIG. 1 and FIG. 2, the outlet 80 is an alternating-current 100 V receptacle. However, the configuration is not limited thereto. The outlet 80 may output alternating-current power of another voltage or output direct-current power of a predetermined voltage. The outlet 80 may be, for example, a direct-current 12 V cigar lighter socket or a direct-current 5 V universal serial bus (USB) socket.

In the above-described first embodiment and second embodiment, as described with reference to FIG. 2, the switching system that switches, in accordance with a control signal from the ECU 100, between a state where the charge and discharge circuit 210 and the inlet 70 are electrically connected and a state where the charge and discharge circuit 210 and the outlet 80 are electrically connected is made up of the switching relays 220, 230 that are two C-contact relays. In the third embodiment, as described with reference to FIG. 5, the switching system is made up of the switching relays 271, 273 that are two A-contact relays and the switching relays 272, 274 that are two B-contact relays. However, the configuration is not limited thereto. The switching system may be made up of the switching relays 271, 273 that are two B-contact relays and the switching relays 272, 274 that are two A-contact relays.

The above-described embodiments may be regarded as the disclosure of the vehicle 1, the charge and discharge system such as the bidirectional chargers 200, 200A, or the controller for a charge and discharge system such as the ECU 100 or may be regarded as the disclosure of a control method that is executed by the controller or a control program that is run by the controller in the vehicle 1 or the charge and discharge system.

Summary

As shown in FIG. 1, FIG. 2, and FIG. 5, each of the bidirectional chargers 200, 200A is capable of performing charging and discharging from and to an external device. Each of the bidirectional chargers 200, 200A includes the charge and discharge circuit 210, the switching system (the switching relays 220, 230 or the switching relays 271, 272, 273, 274), the ECU 100, the voltage sensor 250, and the voltage sensor 260. The charge and discharge circuit 210 converts electric power from the inlet 70 for connection with the connector 340 for supplying electric power from an external device to direct-current power compatible with the electrical storage device configured to store electric power, and converts direct-current power of the electrical storage device 10 from the outlet 80 for connection with the plug 810 for discharging electric power to an external device. The switching system switches between a state where the charge and discharge circuit 210 and the inlet 70 are electrically connected and a state where the charge and discharge circuit 210 and the outlet 80 are electrically connected. The ECU 100 controls the switching system. The voltage sensor 250 detects an alternating-current voltage at the inlet 70. The voltage sensor 260 detects an alternating-current voltage at the outlet 80. As shown in FIG. 3 and FIG. 4, the ECU 100 determines that the switching system has a failure on condition that an alternating-current voltage has been detected by the voltage sensor 250 at the inlet 70 and an alternating-current voltage has been detected by the voltage sensor 260 at the outlet 80 (step S132) and disables charging and discharging (step S133, step S134).

When an alternating-current voltage has been detected at the inlet 70 and an alternating-current voltage has been detected at the outlet 80, it is presumable that the inlet 70 and the outlet 80 are electrically continuous. With the above-described configuration, when an alternating-current voltage has been detected at the inlet 70 and an alternating-current voltage has been detected at the outlet 80, it is determined that the switching system has a failure, and charging and discharging are disabled. As a result, it is possible to reduce the possibility that an electric power not supported by the device connected to the outlet 80 is applied to the device.

As shown in FIG. 3 and FIG. 4, the ECU 100 may disable charging and discharging by controlling the charge and discharge circuit 210 such that conversion of electric power is not performed (step S134).

With the above-described configuration, application of electric power from the electrical storage device 10 via the charge and discharge circuit 210 to the device 800 connected to the outlet 80 is prevented.

As shown in FIG. 3 and FIG. 4, the ECU 100 may disable charging and discharging by disabling supply of electric power from the power supply facility 300, which supplies electric power to the inlet 70 (step S133).

With the above-configuration, application of electric power from the power supply facility 300, which supplies electric power, via the inlet 70 to the device 800 connected to the outlet 80 is prevented.

As shown in FIG. 2 and FIG. 5, the voltage sensor 260 is capable of detecting not only an alternating-current voltage but also a direct-current voltage at the outlet 80. As shown in FIG. 3 and FIG. 4, the ECU 100 may determine that the switching system has no failure on condition that an alternating-current voltage has been detected by the voltage sensor 250 at the inlet 70 and a direct-current voltage has been detected by the voltage sensor 260 at the outlet 80 (step S125) and enable charging and discharging (step S126).

Although an alternating-current voltage input from the inlet 70 is not applied to the outlet 80, a voltage can be detected at the outlet 80 side due to electric charge remaining in the capacitor 820 of the device connected to the outlet 80. With the above configuration, when the detected voltage at the outlet 80 is a direct-current voltage, it may be determined that an alternating-current voltage at the inlet 70 is not applied to the outlet 80, so it is determined that the switching system has no failure. As a result, it is possible to determine that the switching system has no failure when an alternating-current voltage has been detected at the inlet 70 and a direct-current voltage has been detected at the outlet 80, and enable charging and discharging.

As shown in FIG. 2 and FIG. 5, the voltage sensor 250 is capable of detecting not only an alternating-current voltage but also a direct-current voltage at the inlet 70. As shown in FIG. 3 and FIG. 4, the ECU 100 determines that the switching system has a failure on condition that a direct-current voltage has been detected by the voltage sensor 250 at the inlet 70 and a direct-current voltage has been detected by the voltage sensor 260 at the outlet 80 (step S132) and disables charging and discharging (step S133, step S134).

A voltage can be detected at the outlet 80 side due to electric charge remaining in the capacitor 820 of the device 800 connected to the outlet 80. With the above configuration, when the detected voltage at the outlet 80 is direct current and the detected voltage at the inlet 70 is direct current, it may be determined that a direct-current voltage at the outlet 80 is applied to the inlet 70, so it may be determined that the switching system has a failure. As a result, it is possible to determine that the switching system has a failure when a direct-current voltage has been detected at the inlet 70 and a direct-current voltage has been detected at the outlet 80 and disable charging and discharging.

The embodiments described above are illustrative and not restrictive in all respects. The scope of the disclosure is not defined by the description of the above-described embodiments, and is defined by the appended claims. The scope of the disclosure is intended to encompass all modifications within the scope of the appended claims and equivalents thereof.

What is claimed is:

1. A charge and discharge system capable of performing charging and discharging from and to an external device, the charge and discharge system comprising:

a charge and discharge circuit configured to convert electric power from an inlet to direct-current power compatible with an electrical storage device configured to store electric power and convert direct-current power of the electrical storage device to electric power that is discharged from an outlet, the inlet being connected with a connector that supplies electric power from the external device, and the outlet being connected with a plug that discharges electric power to the external device;

a switching system configured to switch between a state where the charge and discharge circuit and the inlet are electrically connected and a state where the charge and discharge circuit and the outlet are electrically connected;

a controller configured to control the switching system;

a first voltage sensor configured to detect an alternating-current voltage and a direct-current voltage at the inlet; and a second voltage sensor configured to detect an alternating-current voltage and a direct-current voltage at the outlet, wherein the controller is configured to:

determine that the switching system has a failure on condition that an alternating-current voltage has been detected by the first voltage sensor at the inlet and an alternating-current voltage has been detected; by the second voltage sensor at the outlet, and disable charging and discharging;

determine that the switching system has no failure on condition that an alternating-current voltage has been detected by the first voltage sensor at the inlet and a direct-current voltage has been detected by the second voltage sensor at the outlet, and enable charging and discharging; and determine that the switching system has a failure on condition that a direct-current voltage has been detected by the first voltage sensor at the inlet and a direct-current voltage has been detected by the second voltage sensor at the outlet, and disable charging and discharging.

2. The charge and discharge system according to claim 1, wherein the controller is configured to disable charging and discharging by controlling the charge and discharge circuit such that conversion of electric power is not performed.

3. The charge and discharge system according to claim 1, wherein the controller is configured to disable charging and discharging by disabling supply of electric power from an external apparatus that supplies electric power to the inlet.

4. A vehicle comprising:

a charge and discharge system capable of performing charging and discharging from and to an external device;

an inlet connected with a connector that supplies electric power from the external device;

an outlet connected with a plug that discharges electric power to the external device; and an electrical storage device configured to store electric power, wherein the charge and discharge system has;

a charge and discharge circuit configured to convert electric power from the inlet to direct-current power compatible with the electrical storage device and convert direct-current power of the electrical storage device to electric power that is discharged from the outlet, a switching system configured to switch between a state where the charge and discharge circuit and the inlet are electrically connected and a state where the charge and discharge circuit and the outlet are electrically connected, a controller configured to control the switching system, a first voltage sensor configured to detect an alternating-current voltage and a direct-current voltage at the inlet; and a second voltage sensor configured to detect an alternating-current voltage and a direct-current voltage at the outlet, wherein the controller is configured to:

determine that the switching system has a failure on condition that an alternating-current voltage has been detected by the first voltage sensor at the inlet and an alternating-current voltage has been detected by the second voltage sensor at the outlet, and disable charging and discharging;

determine that the switching system has no failure on condition that an alternating-current voltage has been detected by the first voltage sensor at the inlet and a direct-current voltage has been detected by the second voltage sensor at the outlet, and enable charging and discharging; and determine that the switching system has a failure on condition that a direct-current voltage has been detected by the first voltage sensor at the inlet and a direct-current voltage has been detected by the second voltage sensor at the outlet, and disable charging and discharging.

5. A control method for a charge and discharge system capable of performing charging and discharging from and to an external device, the charge and discharge system including a charge and discharge circuit configured to convert electric power from an inlet to direct-current power compatible with an electrical storage device configured to store electric power and convert direct-current power of the electrical storage device to electric power that is discharged from an outlet, the inlet being connected with a connector that supplies electric power from the external device, and the outlet being connected with a plug that discharges electric power to the external device;

a switching system configured to switch between a state where the charge and discharge circuit and the inlet are electrically connected and a state where the charge and discharge circuit and the outlet are electrically connected;

a controller configured to control the switching system;

a first voltage sensor configured to detect a voltage of electric power and a direct-current voltage at the inlet; and a second voltage sensor configured to detect a voltage of electric power and a direct-current voltage at the outlet, the control method comprising:

determining, by the controller, that the switching system has a failure on condition that an alternating-current voltage has been detected by the first voltage sensor at the inlet and an alternating-current voltage has been detected by the second voltage sensor at the outlet;

determining, by the controller, that the switching system has no failure on condition that an alternating-current voltage has been detected by the first voltage sensor at the inlet and a direct-current voltage has been detected by the second voltage sensor at the outlet, and enable charging and discharging;

determining, by the controller, that the switching system has a failure on condition that a direct-current voltage has been detected by the first voltage sensor at the inlet and a direct-current voltage has been detected by the second voltage sensor at the outlet, and disable charging and discharging; and disabling charging and discharging, by the controller, when it is determined that the switching system has a failure.

6. The charge and discharge system according to claim 1, further comprising:

a first switching relay; and a second switching relay, wherein each of the first switching relay and the second switching relay is a C-contact relay.

7. The charge and discharge system according to claim 6, wherein:

common contacts of the first and second switching relays are respectively connected to two terminals of the charge and discharge circuit;

normally closed contacts of the first and second switching relays are respectively connected to two terminals of the inlet; and normally open contacts of the first and second switching relays are respectively connected to two terminals of the outlet.

* * * * *